United States Patent [19]
Jani et al.

[11] Patent Number: 5,647,400
[45] Date of Patent: Jul. 15, 1997

[54] POLYFLUOROCARBON/ELASTOMER LAMINATES

[75] Inventors: Bhargav Jani, Highlands Ranch; Fredrick Chipps, Englewood; Joe Haney, Littleton, all of Colo.

[73] Assignee: The Gates Corporation, Denver, Colo.

[21] Appl. No.: 435,694

[22] Filed: May 5, 1995

[51] Int. Cl.$^6$ .................................................. F16L 11/08
[52] U.S. Cl. .................... 138/126; 138/141; 138/153; 138/172; 138/DIG. 3
[58] Field of Search ..................... 138/172, 126, 138/129, 153, 141, 146, DIG. 3, DIG. 7

[56] References Cited

U.S. PATENT DOCUMENTS

| | | | |
|---|---|---|---|
| 2,705,691 | 4/1955 | Panagrossi et al. | 138/DIG. 3 |
| 4,104,095 | 8/1978 | Shaw | 156/83 |
| 4,129,472 | 12/1978 | Hobes et al. | 138/141 |
| 4,634,615 | 1/1987 | Versteegh et al. | 138/141 |
| 4,800,109 | 1/1989 | Washizu | 428/34.9 |
| 5,062,456 | 11/1991 | Cooke et al. | 138/125 |
| 5,070,597 | 12/1991 | Holt et al. | 138/103 |
| 5,084,314 | 1/1992 | Igarashi et al. | 138/DIG. 7 |
| 5,170,011 | 12/1992 | Martucci | 174/47 |
| 5,284,184 | 2/1994 | Noone et al. | 138/121 |
| 5,300,569 | 4/1994 | Drake et al. | 525/78 |
| 5,349,989 | 9/1994 | Legallais | 138/111 |
| 5,356,681 | 10/1994 | Ichikawa et al. | 138/DIG. 3 |

FOREIGN PATENT DOCUMENTS

| | | |
|---|---|---|
| 0598971A1 | 6/1994 | European Pat. Off. . |
| WO96/11354 | 4/1996 | WIPO . |

OTHER PUBLICATIONS

"Surface Activation of Polytetrafluoroethylene by Bonding of Polymeric Silicic Acid", by Mohammed A. Mohammed and Volker Rossbach, *Journal of Applied Polymer Science*, vol. 50, p. 929, Apr. 1975.
Product Bulletin, "Teflon FEP", publication No. H-37052-1, published by DuPont Polymers, May 1992, at page 4, Mechanical Properties.
Product Bulletin, "Fluoroplastics of Daikin Industries: Neoflon FEP Pellets", published by Daikin Industries, Ltd., Osaka Japan, Mar. 1992, at (i).
Product Bulletin, "Teflon (Flurocarbon Resin)/Tefzel (Fluoropolymer Resin)", publication No. H-22779-1, published by DuPont Polymers, Jun. 1992, at pp. 2 and 4.
Ricobond Adhesive Promoters, 30 Apr. 1991, (no author), published by Ricon Resins, Inc., Grand Junction, Colorado.
Ricon "Product Bulletin", Dec. 1991 (no author) published by Ricon Resins, Inc. Grand Junction, Colorado.
"Using Polybutudiene Derived Resins for Improved Elastomer Bonding" 26 Sep. 1991 by Drake, Ronald E., et al. Published by Ricon Resins Inc. Grand Junction Colorado.
Ricobond Use Information, 9 Jul. 1991, by Drake et al.

*Primary Examiner*—David Scherbel
*Assistant Examiner*—James F. Hook
*Attorney, Agent, or Firm*—C. H. Castleman; H. W. Oberg; S. G. Austin

[57] ABSTRACT

Polyfluorocarbon/elastomer bonded laminates are disclosed. Flexible, durable chemical-resistant hose for use in industrial applications, and improved construction for such hose including inner tube members characterized by a dual-layer feature employing such laminate, is also disclosed. This feature comprises an adhesive elastomeric composition which bonds a polyfluorocarbon thermoplastic veneer to a substantially non-polar chemical-resistant carbon-based elastomeric or thermoplastic elastomeric outer layer. The adhesive elastomeric composition useful in the present invention comprises unsaturated polymeric dicarboxylic acids, or derivative adducts, of ethylene propylene diene terpolymer.

16 Claims, 1 Drawing Sheet

POLYFLUOROCARBON/ELASTOMER LAMINATES

BACKGROUND OF THE INVENTION

1. Field of the Invention

The present invention relates to laminates of polyfluorocarbon veneer with elastomers or thermoplastic elastomers, including such products as flexible, durable chemical-resistant hose for use in industrial and other applications. Such hose includes inner tube members displaying good flexibility, excellent heat and chemical resistance and which are characterized by a dual-layer feature. This feature relies on an adhesive elastomeric composition which bonds a thin polyfluorocarbon thermoplastic veneer to a substantially non-polar chemical-resistant organic elastomeric or thermoplastic elastomeric outer layer.

2. Description of the Related Art

Various products use laminates of polyfluorocarbon thermoplastics with elastomers or thermoplastic elastomers, but the bond strength is normally below desirable levels. Other products employing elastomeric or thermoplastic elastomer substrates would benefit from facing the substrate with a thin layer of a polyfluorocarbon thermoplastic for altering frictional properties, providing resistance to chemicals encountered in the application or environment, or the like. The inability to achieve a satisfactory and reliable bond in such laminates continues to be a problem in many applications.

Chemical-resistant hose for use in industrial applications such as tank truck transfer hose commonly includes an elastomeric or thermoplastic tube liner, suitable reinforcement, a helical steel wire or wire braid for vacuum resistance, and a suitable cover to provide flexibility and ease of handling. As the tube liner, highly chemical resistant polyfluorocarbon thermoplastics are optimally employed. Polyfluorocarbon thermoplastics such as polytetrafluoroethylene (PTFE) are highly resistant to high temperature and other chemicals due to the compositions' strong interatomic bonds, wherein fluorine atoms substantially shield the carbon chain backbone. Thus, hose employing PTFE tube liners or the like undergo reduced incidence of degradation and deterioration, and generally enjoy a longer service life compared to hose employing tube liners made of other materials, such as cross-linked polyethylene, ethylene propylene diene terpolymer, or chlorosulfonated polyethylene.

Other common problems affecting chemical-resistant transfer hose are likewise addressed through the use of polyfluorocarbon thermoplastic tube liners. In hose utilizing cross-linked polyethylene, fluoro-elastomers (FKM), ethylene propylene diene terpolymer (EPDM), or chlorosulfonated polyethylene (CSM) as the tube liner material, the transfer of clear liquids and solvents frequently results in unacceptable discoloration of such liquids due to the extraction of oils and resins from liner materials. Polyfluorocarbon thermoplastics such as PTFE and tetrafluoroethylene/hexafluoropropylene copolymer (FEP) are not subject to such extraction. Fluid permeation or seepage through cross-linked polyethylene, FKM, EPDM or CSM inner tubes, and ultimately through outer hose layers is also common. Polyfluorocarbon thermoplastics are known to exhibit very low fluid permeation compared to the above materials.

Hose for use in industrial applications, utilizing tube liners or veneers formed from polyfluorocarbon thermoplastics present processing difficulties as well. For hose having an inner diameter of one inch and greater, veneers are typically extruded in thicknesses of about 0.030 inches and greater. This relatively thick veneer is substantially inflexible, and does not exhibit satisfactory coupling retention to permanent fittings.

While polyfluorocarbon thermoplastics may be extruded into relatively thin veneers, e.g., down to about 0.010 inches (0.254 mm) in thickness, the utilization of such thin veneers necessitates the use of a stabilizing component to impart structural strength to the hose which is otherwise prone to kinking as a result of the poor tensile and hoop strength of the polyfluorocarbon thermoplastic material. One typical method of constructing a chemical-resistant composite hose having a thin polyfluorocarbon thermoplastic veneer comprises bonding the veneer to a braided fabric reinforcement layer by means of an adhesive tape wrapped spirally about the liner. Alternately, a polyfluorocarbon thermoplastic veneer may be encased in a rigid material such as fiberglass or metal. In another form, an outer layer formed from an elastomer or a thermoplastic elastomer may be applied over the polyfluorocarbon thermoplastic veneer. Each of these alternatives is deficient. Encasement in fiberglass or metal is time consuming, and results in an inflexible hose which is unacceptable in many environments. The use of an outer elastomeric or thermoplastic elastomer layer telescoped about a veneer, or the use of fabric reinforcement telescoped about the veneer has proven difficult due to the poor adhesion of the polyfluorocarbon material to other hose components. Moreover, application of braided reinforcement materials involve labor- and time consuming braiding techniques.

The use of a dual-layer inner tube for chemical-resistant hose is nonetheless highly desireable. In single-layer inner tube construction, manufacturing defects, abuse or mishandling may result in hose rupture, seepage or leakage. A double-layer inner tube construction would substantially reduce the risk of leakage or rupture. In the event of such damage to the inner layer, of the inner tube the outer elastomeric layer, selected for its outstanding chemical and heat-resistance, would minimize the threat of catastrophic hose failure.

A flexible, structurally stable, kink-resistant, chemical-resistant transfer hose for use in industrial applications which exhibits good coupling retention to fittings, and which is characterized by a dual-layer inner tube comprising a polyfluorocarbon thermoplastic veneer permanently bonded to an outer layer of a suitable chemical-resistant elastomeric material has not been available in the prior art.

In general, there is a need for laminates of thin layers of polyfluorocarbon thermoplastics with elastomers, including thermoplastic elastomers, which possess sufficient bond strength between the layers to ensure the integrity of the laminate.

SUMMARY OF THE INVENTION

Hence it is an object of the present invention generally to provide reliable laminates of polyfluorocarbon thermoplastics with elastomer or thermoplastic elastomer substrates. It is a specific object, in one aspect of the invention, to provide a flexible, structurally stable, kink-resistant, chemical-resistant hose for use in industrial and other high pressure applications, which exhibits good coupling retention to fittings, has a dual-layer chemical-resistant inner tube formed from a polyfluorocarbon thermoplastic veneer permanently bonded to an outer layer of a suitable chemical-resistant material, and which avoids the problems of the prior art.

Accordingly, in one embodiment of the invention a polyfluorocarbon/elastomer laminate is provided, comprising a first layer of a veneer formed from a polyfluorocarbon thermoplastic material, one surface of which is etched; a second layer formed from a substantially non-polar material chosen from the group consisting of carbon-based elastomers and thermoplastic elastomers, said second layer having a bonding surface juxtaposed said etched surface of the first layer; and an adhesive elastomeric composition disposed between said etched surface of the veneer and said bonding surface of the second layer for bonding the first and second layers together to form the laminate, said adhesive elastomeric composition comprising an unsaturated polymeric dicarboxylic acid or derivative adduct of ethylene propylene diene terpolymer, said second layer and said adhesive elastomeric composition being vulcanized.

In another embodiment of the present invention a chemical-resistant hose is provided, comprising a chemical-resistant dual-layer inner tube formed from a polyfluorocarbon thermoplastic veneer, the outer surface of which is etched. An outer layer formed from a substantially non-polar, chemical resistant carbon-based elastomer or thermoplastic elastomer is bonded to the veneer to form the dual-layer inner tube. Bonding is accomplished using an adhesive elastomeric composition disposed between the etched outer surface of the veneer and the outer layer. The adhesive elastomeric composition comprises an unsaturated polymeric dicarboxylic acid, or derivative adduct, of EPDM. The outer layer and the adhesive elastomeric composition are vulcanized to provide maximum adhesion. In addition, the chemical-resistant hose comprises at least one reinforcement layer disposed about the inner tube, a plastic or carbon steel helical strand where collapse or vacuum resistance is required, and an outer cover disposed about the reinforcement layer and/or helical strand.

As the polyfluorocarbon thermoplastic veneer, polytetrafluoroethylene (PTFE) or tetrafluoroethylene/hexafluoropropylene copolymer (FEP) may be used. As the substantially non-polar, chemical-resistant carbon-based elastomer, cross-linked polyethylene, ethylene propylene diene terpolymer, rubber-extended cross-linked polyethylene, or mixtures thereof may be used. As the substantially non-polar, chemical resistant carbon-based thermoplastic elastomer, polyolefin compositions available under the trade name, Alcryn™, or thermoplastic rubbers available under the trade name, Santoprene™, may be used. As the adhesive elastomeric composition, an unsaturated polymeric dicarboxylic acid, or derivative adduct, of EPDM may be used. Such compositions include those available under the trade names, Ricobond ES-2™ and Ricobond EP-3™.

In a further embodiment of the present invention a multi-layer chemical-resistant hose for use in industrial applications is provided, comprising a chemical-resistant dual-layer inner tube formed from a tetrafluoroethylene/hexafluoropropylene copolymer veneer, the outer surface of which is etched. An outer layer formed from a rubber-extended cross-linked polyethylene is bonded to the veneer, to form the dual-layer inner tube portion of the multi-layer hose. Bonding between the veneer and the outer layer of the dual-layer inner tube is accomplished by an adhesive elastomeric composition disposed between the etched outer surface of the veneer and the outer layer. The adhesive elastomeric composition comprises a polybutadiene/maleic anhydride adduct of EPDM. The outer layer and the adhesive elastomeric composition are peroxide-cured to provide maximum adhesion. In addition, the chemical-resistant hose comprises at least one reinforcement layer disposed about the inner tube, one plastic or carbon steel helical strand for collapse or vacuum resistance, and an outer cover disposed about the reinforcement layer and helical strand.

As the mixture comprising rubber extended cross-linked polyethylene, the composition available under the trade name, Gatron™, may be used.

DESCRIPTION OF THE PREFERRED EMBODIMENTS

Figure 1:
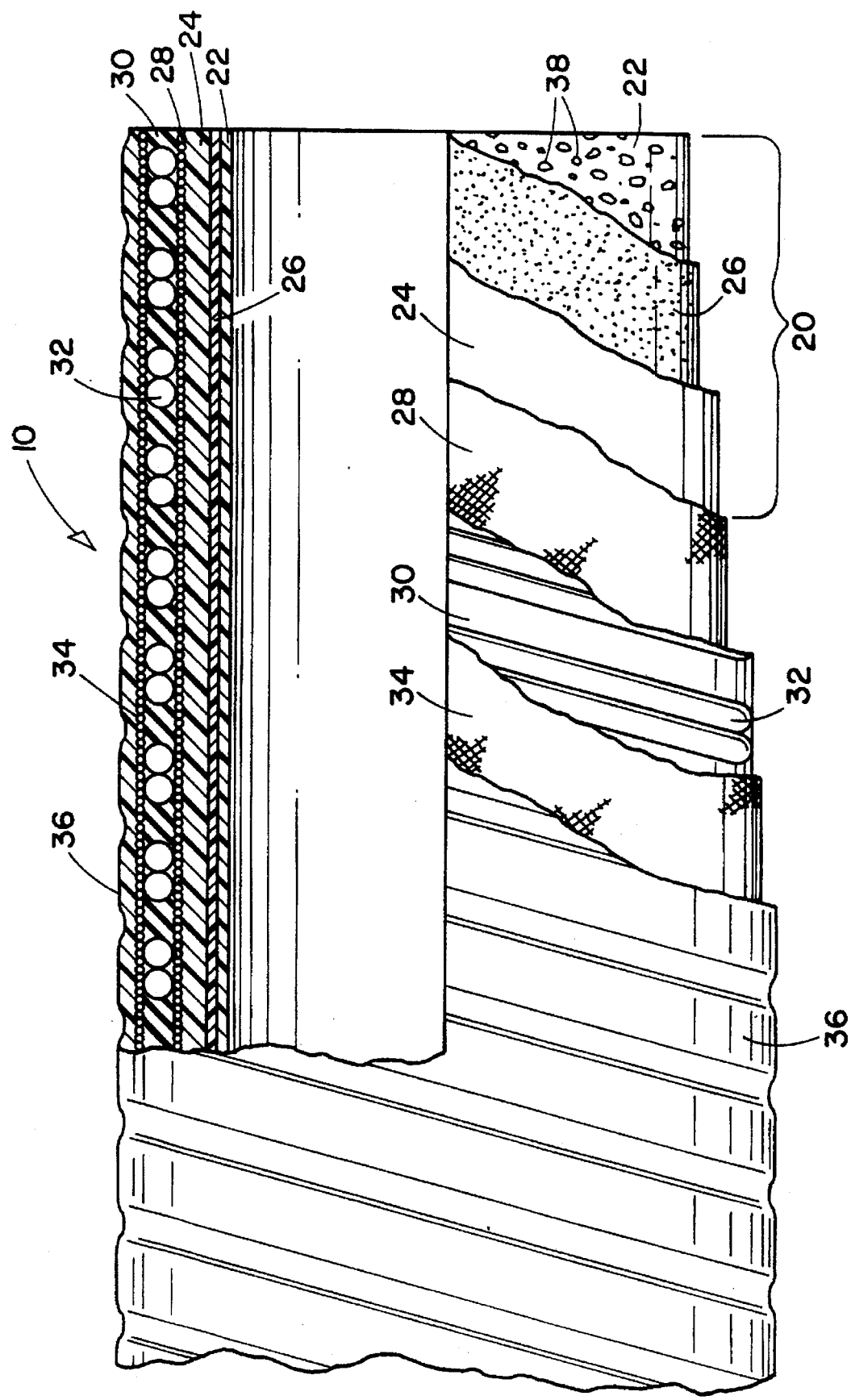
FIG. 1 is a layered cut-away side view of a multi-layer hose including a dual-layer inner tube constructed in accordance with one embodiment of the present invention.

The invention applies broadly to laminates of polyfluorocarbon thermoplastics with substantially non-polar carbon-based elastomers and/or carbon-based thermoplastic elastomers. Examples of the numerous classes of products contemplated by the laminates of the invention include synchronous power transmission belts whose teeth are faced with teflon™ or the like, using the laminate of the invention to reduce the coefficient of friction of the facing, thereby reducing noise and heat build-up during operation of the belt. Another example is a teflon-coated printing roll, the teflon coating being laminated to a substantially non-polar elastomeric substrate of EPDM or the like. Still another example is a food handling hose, employing a teflon veneer liner laminated to an EPDM outer tube layer, over which are telescoped a reinforcement and an outer cover. Although a detailed description of the invention as applied to chemical resistant hose follows, it will be appreciated that the invention is not so limited.

Referring to FIG. 1, a chemical-resistant hose 10 constructed in accordance with one embodiment of the present invention is shown. FIG. 1 shows a cut-away side view with elements of the hose shown telescoped about one another. The hose includes a dual-layer inner tube 20, comprising a veneer 22, an outer layer 24 and an adhesive elastomeric composition 26 for bonding the veneer 22 to the outer layer 24. At least one reinforcing layer 28 is disposed about the inner tube 20. A supporting layer 30 of a suitable elastomeric material is preferably disposed about the reinforcing layer 28. A helical strand or pair of strands 32 is preferably disposed about the supporting layer 30. The purpose of the supporting layer 30 is to support the helical strand 32. In the embodiment shown in FIG. 1, a second reinforcing layer 34 is shown, disposed about the helical strand 32 and in opposite lay sense to layer 28. An outer cover 36 made of a suitable elastomeric material is disposed about the second reinforcing layer 34.

The hose is designed for industrial uses such as for transferring acids and other chemicals. For such use, it is necessary that the inner tube be constructed of a highly chemical-resistant, robust and durable material. In accordance with the invention the inner tube 20 is formed in a dual-layer construction which substantially reduces the risk of rupture or seepage inherent in single-layer construction hose. The dual-layer innertube 20 comprises a veneer 22 formed of a suitable polyfluorocarbon thermoplastic material which is substantially impermeable to the chemical medium, and an outer layer bonded to the veneer by the adhesive composition described below. Suitable materials for the veneer include polytetrafluoroethylene (PTFE), and tetrafluoroethylene/hexafluoroethylene copolymers (FEP). The preferred polyfluorocarbon thermoplastic material is FEP.

For the outer layer 24 of the dual-layer inner tube 20, a chemical-resistant substantially non-polar carbon-based elastomer or thermoplastic elastomer is used. What is meant by the term, "carbon-based" in this context is an elastomer or thermoplastic elastomer having a backbone or polymer chain which is based on carbon. Suitable chemical-resistant elastomers include cross-linked polyethylene, EPDM, polypropylene, rubber-extended cross-linked polyethylene and mixtures thereof. A material suited for this use is a rubber-extended cross-linked polyethylene supplied under the trade name, Gatron™ (manufactured by The Gates Rubber Co.)[1], due to its exceptional heat- and chemical-resistance. The outer layer 24 preferably has a thickness of from about 0.025 to about 0.100 inches (0.635–2.54 mm) for a hose having an inner diameter of from about 1 to about 3 inches (25–76 mm), and more preferably has a thickness of from about 0.030 to about 0.060 inches (0.762–1.524 mm).

[1] Gatron™ includes in addition to XPE as the major component, EPDM, silica filler, phthalate oil, triallyl isocyanurate, wax and dicumyl peroxide and sulfur as cross-linking agents.

It will be appreciated that the particular type of substantially non-polar elastomer or thermoplastic elastomer utilized, and its dimensions will be tailored to the particular application. For instance, EPDM is currently preferred for use in a food handling hose, employing the laminate of the invention.

Polyfluorocarbon thermoplastics such as FEP and PTFE exhibit notoriously poor adherence to other materials. It is known that etching the outer surface of the polyfluorocarbon thermoplastics to create bonding sites improves adherence of these polyfluorocarbon thermoplastics to other materials. Etching may be accomplished by various methods known to the art, including mechanical methods, oxidizing flames, corona discharge, oxidizing acid baths or other chemical baths. Thus, the outer surface 38 of the veneer 22 is etched using known methods, in order to provide bonding sites along the carbon backbone of the polyfluorocarbon thermoplastic material.

The adhesive elastomeric composition layer 26 is specifically selected to provide an exceptional bond between the highly polar polyfluorocarbon thermoplastic of the veneer 22 and the highly non-polar carbon-based elastomer or carbon-based thermoplastic elastomer of the outer layer 24. Cross-linked polyethylene generally, and rubber-extended cross-linked polyethylene specifically preferred for outer tubular layer 24 in the acid chemical hose embodiment, exhibit poor adherence to other materials. This difficulty is compounded in this context by the poor adherence characteristic of polyfluorocarbon thermoplastics. The adhesive elastomeric compositions which have been discovered to be particularly useful in the present invention in all its embodiments include unsaturated polymeric dicarboxylic acids, or derivative adducts, of EPDM. Such materials are disclosed in U.S. Pat. No. 5,300,569, and are available under the trade names Ricobond ES-2™ and Ricobond EP-3™.

The adhesive elastomeric composition comprises from about 5 to about 15 parts per hundred weight of EPDM (phr) of unsaturated polymeric dicarboxylic acid or derivative adduct. The preferred compositions comprise the reaction product of maleic anhydride and an unsaturated polymer selected from the group consisting of polybutadiene, polyisoprene, styrene butadiene copolymer and styrene isoprene copolymer, which product is further adducted to EPDM. The most preferred composition is a polybutadiene/maleic anhydride adduct of ethylene propylene diene terpolymer, available under the trade name, Ricobond EP-3™, the formula of which is shown in the aforementioned U.S. Pat. No. 5,300,569. As noted in U.S. Pat. No. 5,300,569, the adhesive elastomer compositions are cured for maximum adherence. For the material known as Ricobond ES-2™, vulcanization is by sulfur curatives, and for Ricobond EP-3™, by peroxide curatives. In formulating the adhesive elastomer compositions useful in the present invention, one skilled in the art would appreciate the modifications to the compositions needed to adjust the processibility of the composition in any given environment. For example, process aids such as paraffinic or aromatic oils or hydrocarbon resins may be used in appropriate amounts to adjust tack. The adhesive elastomeric composition is preferably in the form of a tape, measuring from about 0.010 to about 0.030 inches (0.2540–0.762 mm) in thickness for a hose having an inner diameter of from about 1 to about 3 inches (25–76 mm). For other applications, the adhesive may be applied in any known suitable manner, such as by extrusion, dipping or the like.

Because the hose may be used in various environments requiring a great deal of flexibility, it is essential that the hose have a small bend radius. Thus, it is necessary that the layers comprising the dual-layer inner tube 20 be very thin. Accordingly, the polyfluorocarbon thermoplastic veneer 22 is extruded in thicknesses of from about 0.005 to about 0.025 inches (0.127–0.635 mm) for hose having an inner diameter of from about 1 to about 3 inches (25–76 mm), and more preferably, of from about 0.008 to about 0.015 inches (0.2030–0.381 mm).

The dual-layer inner tube 20 provides the base for the reinforcement layer 28 or layers, the helical strand 32 if present, and the outer cover 38. The reinforcement layer 28 is applied around the outer layer 24 of the dual-layer inner tube 20. This reinforcement layer 28 provides strength to the dual-layer inner tube 20. Any suitable reinforcement material known to the art may be used, including polyester fabric, nylon, aramid e.g. Kevlar™ and tire cord. The preferred reinforcement material is polyester tire cord. The reinforcement material is preferably bias wrapped at approximately 45 degrees to the axis of the tubing so as to provide maximum flexibility thereto. The reinforcement material may alternately be cut on a bias in order to accomplish the same result.

Supporting layer 30 surrounds, supports and bonds helical strand 32 and is sandwiched between reinforcing layers 28, 34. Layer 30 is preferably formed of gum rubber e.g. EPDM, Gatron™ and the like.

The helical strand 32 contributes to the small bend radius characteristic of the hose. The helical strand may be of any suitable material known to the art, and is preferably a carbon steel wire or a plastic monofilament strand. In environments in which strong vacuum resistance is required, the most preferred material is carbon steel. In environments in which good collapse resistance is required, a plastic monofilament strand is preferred. The helical strand 32 preferably has a diameter in the range of from about 0.048 to about 0.148 inches (1.219–3.759 mm). The actual dimensions of the strand depend on the size of the hose and the desired application, and may be properly selected by one skilled in the art. For instance, for hose with an inner diameter exceeding 2" (50.8 mm), we have found that increased crush resistance results from applying strands in side-by-side pairs, as illustrated in FIG. 1 (known, per se, in food handling hose). In a preferred embodiment of the present invention, the helical strand 32 is applied between two reinforcement layers, which layers are wrapped about the dual-layer inner tube in a direction opposite one another.

It will be appreciated that, depending upon the application for the hose, diameter, pressure rating and the like, reinforcement configurations other than wrapped may be employed, such as braid, spiral and knit.

The outer cover 36 is disposed about the outer reinforcement layer 34, and may be formed from any suitable elastomeric or thermoplastic elastomer material. The cover contributes durability, ease of handling and abrasion resistance to the hose. Suitable materials include cross-linked polyethylene, polypropylene, EPDM and CSM. The preferred material for use as the cover material is EPDM due to its good weatherability, ozone resistance and heat resistance.

The flexible, durable multi-layer chemical-resistant hose of the present invention may be constructed according to conventional hose-building techniques well known to the art, including extrusion and etching of the veneer, and wrapping of the adhesive elastomeric tape, outer tube layer, first reinforcement layer, supporting layer, helical strand, second reinforcement layer and outer cover, about a building pole. A heat shrinkable nylon cure tape, and/or filament rope may be wrapped about the hose in conventional manner, and the hose cured by vulcanization. These methods are all well known to the art.

Using the materials and concepts discussed herein, we have been able to construct a flexible, durable, chemical-resistant hose which exhibits excellent coupling retention, having an inner diameter of 3.0 inches (76 mm), and a length of over 200 feet (62 m). It is estimated that a comparable hose having an inner diameter of up to about 6.0 inches (152.4 mm) may likewise be built. Relative thicknesses of the various layers of polyfluorocarbon thermoplastic, outer layer and the like, would normally be greater for hose having a larger inner diameter. Hose of even greater inner diameters incorporating the concepts of the present invention may be built by varying the gauge of the helical strand. Smaller than 1.0 inch (25.4 mm) inner diameter hose may also be constructed in accordance with the invention, such as in an extruded, continuous length process.

The present invention is further illustrated but is not intended to be limited by the following examples, in which all parts and percentages are by weight unless otherwise specified.

Several hose specimens were constructed according to the following protocol. Hose specimens varied in inner diameter; inner diameters of 1 inch (25.4 mm), 1.5 inches (38.1 mm) and 2.0 inches (50.8 mm) were tested, as indicated. In each case, construction was as follows:

TABLE A

| Hose Construction | |
|---|---|
| Dual-layer inner tube | |
| Veneer material and thickness: | FEP, 0.012" gauge (0.305 mm) |
| Adhesive tape and thickness: | EP-3 ™ 0.025" gauge tape (.635 mm) |
| Dual-layer inner tube | |
| Outer layer material and thickness: | Gatron ™ 0.050" gauge (1.27 mm) |
| Reinforcement material and thickness: | Polyester (PET) tire cord, 1.72 lbs/yd² (.933 kg/m²), 0.029" gauge (0.737 mm) |
| Support layer material and thickness: | EPDM, 0.040" gauge (1.016 mm) |
| Helical strand material and dimensions: | Monofilament polyester (PET), 230 ft/lb (154.2 m/kg), 0.090" gauge (2.286 mm), pitch 1" (25.4 mm) |
| 2nd Reinforcement material and thickness: | Polyester (PET) tire cord, 1.72 lbs/yd² (.933 kg/m²), 0.029" gauge (0.737 mm) |
| Outer Cover material and thickness: | EPDM, 0.064" gauge (1.626 mm) |

Hose constructed in accordance with the materials and thicknesses described in Table A were further coupled to stainless steel cam and groove fittings available under the trade name Dixon™ Swaged Boss Lock™. These fittings were characterized by a ferrule of RC-200-2709, and a die of 3" (76 mm)×2¹⁹⁄₃₂" (66 mm).

In the following tables, hose samples in accordance with the invention were subjected to a proofing analysis. The proof analysis consists of holding hose samples at one-and-one-half or twice their rated pressure (WP), at 300° F. (149° C.), and inspecting the samples for leakage or loss of pressure. The samples are then exposed to elevated pressure until they burst. The acceptance criteria for hose is one which bursts at no less than three times its rated pressure at test temperature. Hose samples were also tested for crush resistance. Our crush resistance analysis consists of noting initial hose outer diameter (OD) of 6 ft. (1.85 m) lengths of hose, driving over the hose with a two-ton (907.2 kg) fork-lift truck, and then noting the change in outer diameter after a fixed recovery period. Data was recorded for a single exposure, ten sequential exposures, and 50 sequential exposures at the same point of each hose.

Finally, aging tests were performed on U-shaped hose which were filled and held in continuous contact with various chemicals for stated periods of times. The samples were proofed, inspected and burst, according to the proofing analysis protocol described above.

TABLE 1

| High Temperature Proof Analysis 1.5 inch (38.1 mm) inner diameter hose | | |
|---|---|---|
| | Hose 1 | Hose 2 |
| Proof at 300° F. (149° C.) 400 psi (2.8 MPa) | no leaks, 1 min. | no leaks, 1 min. |
| Hose rating | 200 psi (1.4 MPa) | 200 psi (1.4 MPa) |
| Hose burst at 300° F. | 745 psi (5.2 MPa) | 690 psi (4.8 MPa) |

TABLE 2

| High Temperature Proof Analysis 2.0 inch (50.8 mm) inner diameter hose | | |
|---|---|---|
| | Hose 3 | Hose 4 |
| Proof at 300° F. (149° C.) 400 psi (2.8 MPa) | no leaks, 1 min. | no leaks, 1 min. |
| Hose rating | 200 psi (1.4 MPa) | 200 psi (1.4 MPa) |
| Hose burst at 300° F. (149° C.) | 690 psi (4.8 MPa) | 600 psi (4.2 MPa) |

For each of the examples shown in Tables 1 and 2, hose samples burst at three times (or greater) the working pressure of the hose.

TABLE 3

| Adhesion 2.0 inch (50.8 mm) inner diameter hose | | |
|---|---|---|
| | Hose 5 | Hose 6 |
| Original | | |
| veneer: | 37 lbs. (16.8 kg) | 43 lbs. (19.5 kg) |
| outer layer reinforcement: | 26 lbs. (11.8 kg) | 27 lbs. (12.3 kg) |
| reinforcement reinforcement: | 23 lbs. (10.5 kg) | 20 lbs. (9.1 kg) |

TABLE 3-continued

Adhesion
2.0 inch (50.8 mm) inner diameter hose

|  | Hose 5 | Hose 6 |
|---|---|---|
| cover Oven Aged at 250° F. (121° C.), 70 hrs. | | |
| veneer: outer layer | 26 lbs. (11.8 kg) | — |
| reinforcement: reinforcement Oven Aged at 300° F. (149° C.), 70 hrs. | 32 lbs. (14.5 kg) | — |
| veneer: outer layer | 23 lbs. (10.5 kg) | — |
| reinforcement: reinforcement | 27 lbs. (12.3 kg) | — |

To illustrate the previously existing state of the art regarding the quality of adhesion of polyfluorocarbon thermoplastic veneers to substantially non-polar chemical-resistant carbon-based elastomeric or thermoplastic elastomeric outer layers, the following adhesion analysis was performed. Two one-inch strips were pulled from a 0.012" gauge (0.305 mm) FEP veneer to form test strips measuring one inch (25.4 mm) by six inches (152.4 mm). For each test strip, one surface of the FEP veneer was etched. An adhesive was applied to the etched surface of each test strip, in a thickness of 0.050 inches (1.27 mm). The adhesive used for Comparative Example X was a solvent-based adhesive sold under the trade name, Chemlok™ 250. The adhesive used for Comparative Example Z was a two-part epoxy adhesive sold under the trade name, Scotch-Weld™ 2216. The adhesive used to illustrate one embodiment of the invention designated as example Q was Ricobond EP-3™. A layer of rubber-extended cross-linked polyethylene sold under the trade name, Gatron™, measuring 0.025 inches (0.508 mm) in thickness was applied to each of the test strips. The test strips were cured at 330° F. (166° C.) for 60 minutes, and then analyzed for adhesion according to ASTM D380 and D413. The results of the analysis are shown in Table 4.

TABLE 4

Adhesion
Comparative Examples

|  | Ave. Load (lbs.) | Ave. Load/Width (lbs./in.) | Load at Max. Load (lbs.) |
|---|---|---|---|
| Comparative Example X | 2.606 (1.18 kg) | 2.606 (.46 kN/m) | 2.831 (1.29 kg) |
| Comparative Example Z | 4.838 (2.19 kg) | 4.838 (.85 kN/m) | 5.582 (2.54 kg) |
| Example Q (EP-3™) | 17.57 (7.98 kg) | 17.57 (3.07 kN/m) | 28.57 (12.99 kg) |

TABLE 5

Crush Test
2.0 inch (50.8 mm) Inner Diameter Hose

|  | Hose A | Hose B | Hose C |
|---|---|---|---|
| Original OD | 2.550" (64.77 mm) | 2.547" (64.69 mm) | 2.550" (64.77 mm) |
| Times crushed | 1 | 10 | 50 |
| % Recovery after 5 mins. | 93.3% | 87.3% | 81.4% |
| % Recovery after 15 mins. | 95.0% | 88.1% | 81.6% |
| % Recovery after 24 hrs. | 95.9% | 90.0% | — |

For the crush test data shown in Table 5, 6 ft. (1.85 m) lengths of the hose described above, having a 0.090" (2.286 mm) polyester (PET) monofilament helical strand laid at a pitch of 1", with two strands spaced equidistant from each other, were crushed the number of times shown, at the same hose area, with a two minute interval between crushes. A ten percent reduction in hose OD is considered acceptable in the art, when measuring flattening under vacuum or bend radius conditions. The crush test subjects the hose to severe conditions which are relatively unlikely in use environments. Recovery of the hose OD is likely to be enhanced under this test when the hose is under working pressure. Suction would likely detrimentally impact recovery of hose OD under this test. Where hose is likely to be subject to full vacuum at elevated temperatures, a carbon steel helical strand is recommended.

TABLE 6

U-Bend Aging Analysis
1" inner (25.4 mm) diameter hose

|  | Hose D | Hose E | Hose F | Hose G | Hose H |
|---|---|---|---|---|---|
| Chemical | 93% Red $HNO_3$ | 98% $H_2SO_4$ | 100% Cyclohexane | 100% $CCl_4$ | 100% Butadiene |
| Proof 1.5XWP after 7 days | Pass | Pass | Pass | Pass | Pass |
| Tube Inspection | No damage | No damage | No damage | No damage | No damage |
| Hose Burst after 7 days, (psi) | 1687 (11.8 MPa) | 1671 (11.7 MPa) | 1660 (11.6 MPa) | 1778 (12.5 MPa) | 1599 (11.2 MPa) |
| Proof at 1.5XWP after 30 days | Pass | Pass | Pass | Pass | Pass |

TABLE 6-continued

U-Bend Aging Analysis
1" inner (25.4 mm) diameter hose

|  | Hose D | Hose E | Hose F | Hose G | Hose H |
|---|---|---|---|---|---|
| Tube Inspection | No damage | No damage | No damage | No damage | No damage |
| Hose Burst after 30 days, (psi) | 1390 (9.7 MPa) | 1832 (12.8 MPa) | 1684 (11.8 MPa) | 1690 (11.8 MPa) | 1624 (11.4 MPa) |

For the analyses of Table 6, 1" (25.4 mm) hose constructed according to the protocol described in Table A were filled with the specified chemical; the hose samples were bent into a U-shaped configuration; the samples were allowed to stand in continuous contact with the given chemical at room temperature for the period of time indicated. The hose were then subject to proof analysis at 1.5 times their working pressure, visually inspected for leaks, cracks or other damage, and then burst. Notably, two substantially identical samples of hose which were untilled, were similarly subjected to proof analysis at 1.5 times their working pressure, visually inspected, and then burst. These unfilled samples exhibited hose burst at 1649 psi (11.5 MPa) (after 7 days) and 1510 psi (10.6 MPa) (after 30 days). These results are substantially indistinguishable from the results shown in Table 6, thus indicating the minimal effect of permeation on the hose when in extended contact with typical industrial chemicals. In each case, hose burst occurred in the body center or near the coupling.

The chemical-resistant multi-layer hose of the present invention is light-weight, impermeable to most liquid chemicals, resistant to 300° F. (149° C.), and is chemically resistant to most known industrial chemicals. It is crush-resistant and remains free of permanent kinks, when used with a plastic helical strand. For room temperature and elevated temperature vacuum and suction requirements, greatly enhanced service life is achieved using a helical steel wire strand. Its dual-layer inner tube laminate provides a high degree of product safety. The excellent bond between the polyfluorocarbon veneer and the outer elastomeric or thermoplastic elastomer layer of the dual-layer inner tube results in a hose which exhibits good coupling retention at both room temperature and elevated temperatures when coupled to permanent fittings. The thinness of the polyfluorocarbon thermoplastic veneer contributes to the hose's improved coupling retention while ensuring a high degree of overall flexibility.

Although the present invention has been described in detail in the foregoing for the purpose of illustration, it is to be understood that such detail is solely for that purpose and that variations can be made therein by one skilled in the art without departing from the spirit or scope of the present invention except as it may be limited by the claims. The invention illustratively disclosed herein may be suitably practiced in the absence of any element which is not specifically disclosed herein.

What is claimed is:

1. A polyfluorocarbon/elastomer laminate comprising:
a) a first layer of a veneer formed from a polyfluorocarbon thermoplastic material, one surface of which is etched;
b) a second layer formed from a substantially non-polar material chosen from the group consisting of carbon-based elastomers and carbon-based thermoplastic elastomers, said second layer having a bonding surface juxtaposed said etched surface of the first layer; and
c) an adhesive elastomeric composition disposed between said etched surface of the first layer and said bonding surface of the second layer bonding the first and second layers together to form the laminate, said adhesive elastomeric composition comprising an unsaturated polymeric dicarboxylic acid or derivative adduct of ethylene propylene diene terpolymer, said second layer and said adhesive elastomeric composition being vulcanized.

2. The laminate of claim 1 in the form of a multi-layer chemical resistant hose exhibiting good coupling retention and flexibility comprising an inner tube and reinforcement, in which the laminate forms at least a portion of the inner tube of the hose.

3. A multi-layer high pressure chemical resistant hose exhibiting good coupling retention and flexibility comprising:
a) a chemical-resistant dual-layer inner tube comprising;
  i) a veneer formed from a polyfluorocarbon thermoplastic material, the outer surface of which is etched;
  ii) an outer layer formed from a substantially non-polar chemical resistant material chosen from the group consisting of carbon-based elastomers and carbon-based thermoplastic elastomers, said outer layer being disposed coaxially about said veneer; and
  iii) an adhesive elastomeric composition disposed between said etched outer surface of said veneer and said outer layer, bonding said veneer to said outer layer, said adhesive elastomeric composition comprising an unsaturated polymeric dicarboxylic acid or derivative adduct of ethylene propylene diene terpolymer, said outer layer and said adhesive elastomeric composition being vulcanized;
b) at least one reinforcement layer disposed about said dual-layer inner tube; and
c) an elastomeric outer cover disposed outwardly of said reinforcement layer.

4. The hose of claim 3 for use in industrial applications, wherein a helical strand is disposed about said reinforcement layer.

5. The hose of claim 3, wherein said polyfluorocarbon thermoplastic material is chosen from the group consisting of:
a) polytetrafluoroethylene; and
b) tetrafluoroethylene/hexafluoropropylene copolymer.

6. The hose of claim 3, wherein said carbon-based elastomer is selected from the group consisting of:
a) ethylene propylene diene terpolymer;
b) cross-linked polyethylene;
c) polypropylene; and
d) rubber-extended cross-linked polyethylene.

7. The hose of claim 3, wherein said carbon-based thermoplastic elastomer is one selected from the group consisting of:

a) halogenated polyolefin compositions: and b) thermoplastic rubbers.

8. The hose of claim 3, wherein said adhesive elastomeric composition comprises from about 5 to about 15 parts per hundred weight of said ethylene propylene diene terpolymer of said unsaturated polymeric dicarboxylic acid or derivative adduct.

9. The hose of claim 3, wherein said veneer has a thickness of from about 0.005 to about 0.025 inches.

10. The hose of claim 3, wherein said veneer has a thickness of from about 0.008 to about 0.015 inches.

11. The hose of claim 3, wherein said adhesive elastomeric composition is in the form of a tape measuring from about 0.010 to about 0.030 inches in thickness.

12. The hose of claim 3, wherein said outer layer has a thickness of from about 0.025 to about 0.100 inches.

13. The hose of claim 4 wherein the strand is formed of plastic monofilament, lending crush resistance to the hose.

14. A multi-layer high pressure chemical-resistant hose exhibiting good coupling retention and flexibility comprising:

a) a chemical-resistant dual-layer inner tube comprising:
  i) a veneer formed from tetrafluoroethylene-hexafluoropropylene copolymer, the outer surface of which is etched, said veneer measuring from about 0.008 to about 0.015 inches in thickness;
  ii) an outer layer formed from rubber-extended cross-linked polyethylene, said outer layer being disposed coaxially about said veneer; and
  iii) an adhesive elastomeric composition disposed between said etched outer surface of said veneer and said outer layer, for bonding said veneer to said outer layer, said adhesive elastomeric composition comprising a polybutadiene/maleic anhydride adduct of ethylene propylene diene terpolymer, said outer layer and said adhesive elastomeric composition being peroxide-cured;

b) at least one reinforcement layer disposed about said inner tube; and c) an elastomeric outer cover disposed about said reinforcement layer.

15. The hose of claim 14 wherein a helical strand is embedded in the hose and is sandwiched between inner and outer reinforcement layers.

16. The hose of claim 15 wherein the strand is formed of plastic monofilament, lending crush resistance to the hose.

* * * * *